United States Patent [19]

Kreitner et al.

[11] Patent Number: 5,082,689
[45] Date of Patent: Jan. 21, 1992

[54] PRODUCTION OF MAGNETIC RECORDING MEDIA

[75] Inventors: Ludwig Kreitner, Heppenheim; Werner Grau, Bobenheim-Roxheim; August Lehner, Roedersheim-Gronau; Hans Reichert, Oberkirch; Friedrich Sommermann, Kehl; Norbert Schneider, Altrip; Gerd Erhardt, Kehl, all of Fed. Rep. of Germany

[73] Assignee: Basf Aktiengesellschaft, Ludwigshafen, Fed. Rep. of Germany

[21] Appl. No.: 571,229

[22] Filed: Aug. 23, 1990

[30] Foreign Application Priority Data

Sep. 2, 1989 [DE] Fed. Rep. of Germany ....... 3929166

[51] Int. Cl.⁵ .............................................. B05D 5/12
[52] U.S. Cl. .................................... 427/128; 427/130
[58] Field of Search ................................ 427/128-132, 427/48; 428/694, 695, 900; 252/62.54

[56] References Cited

U.S. PATENT DOCUMENTS 2,871,218 1/1959 Schollenberger et al. .

Primary Examiner—Bernard Pianalto
Attorney, Agent, or Firm—Keil & Weinkauf

[57] ABSTRACT

Magnetic recording media are produced by preparing a dispersion of anisotropic magnetic materials in solution in an organic binder using dispersants and further conventional additives, applying the dispersion in the form of a layer onto a nonmagnetic substrate and solidifying the applied magnetic layer, by a process in which a cylindrical grinding chamber is used which is provided with an anchor stirrer or helical stirrer and contains grinding media whose specific gravity is lower than that of the magnetic material.

6 Claims, No Drawings

PRODUCTION OF MAGNETIC RECORDING MEDIA

The present invention relates to a process for the production of magnetic recording media by preparing a dispersion of anisotropic magnetic materials in solution in an organic binder using dispersants and further conventional additives, applying the dispersion in the form of a layer onto a nonmagnetic substrate and solidifying the applied magnetic layer.

Magnetic recording media are used for the recording and playback of sound, images and data. Constantly increasing requirements which the recording media have to meet make further improvement of the magnetic and electroacoustic properties necessary. For example, the trend toward higher recording densities in all of the stated application forms necessitates the production of increasingly thin magnetic layers. For this reason, the packing density of the magnetic material in the magnetic layer, the residual induction in the recording direction, the uniform distribution of the magnetic material in the layer and the surface smoothness and the uniformity of the layer must be greatly improved. The frequency components, for example of an audio event at the upper limit of audibility, are particularly important for recognition. The magnetic layer must therefore be able to store and reproduce these high frequencies as well as the low frequencies faithfully with regard to amplitude.

The preparation of dispersions containing magnetic material in powder form during the production of magnetic recording media is known. These dispersions consist of the magnetic material in powder form, a solvent or solvent mixture, one or more organic polymers or prepolymers which are soluble or dispersible in this solvent or solvent mixture and further organic and/or inorganic additives, such as lubricants, viscosity regulators, stabilizers, inert inorganic substances for regulating the conductivity, the abrasion, the roughness, etc. The preparation of the dispersion from the stated components is carried out in dispersing apparatuses, generally referred to as mills, in which, by the action of high shear gradient, the materials in powder form are substantially separated into their individual particles and are coated with the binder. Owing to the method of preparation and to the subsequent preparation of the magnetic materials, agglomerates composed of individual particles and having very different secondary particle diameters are formed. For the production of high quality magnetic recording media, however, it is necessary for the generally acicular, magnetic particles to be present as substantially uniform individual particles in a predetermined preferred direction corresponding to the recording direction and at equal distances from one another in the magnetic layer.

Very different methods have been described for improving the dispersing process, for example optimization of the binders, of the dispersants and of the magnetic materials. Once the binders, dispersants, lubricants, fillers and magnetic materials have been established by optimization, it is still necessary to obtain the optimum properties with such a formulation by an economical dispersing process. We have found that the dispersing processes used to date have either very long dispersing times at low viscosity or very high shear forces and a shorter milling time and hence damage the magnetic needles during division of the secondary particles into individual needles.

The known processes, as described in, for example German Patent 1 285 277 have a very low spacetime yield; in addition, the magnetic layers formed do not fully display the properties expected from the magnetic materials, for example low signal to print-through ratio and/or residual induction. Furthermore, the measure described in DE-A 3 526 415 does not lead to magnetic layers in which optimum magnetic properties and an optimum signal to print-through ratio result. Another disadvantage is that the grinding media used here, for example glass spheres having a density of from 2 to 3 $g/cm^3$, lead to a sharp increase in errors. Another disadvantage is that only finely divided magnetic pigments can be separated into particles. Larger magnetic needles are partially destroyed owing to the very high energy density in the stirred ball mill.

It is an object of the present invention to provide a dispersing process in which magnetic materials can be converted into a homogeneous stable dispersion in a very short dispersing time by a very gentle method without damaging the needle shape. It is a further object of the present invention to improve the magnetic properties, such as the residual induction and the magnetic orientation of the shape-anisotropic particles, and all electroacoustic data, for example the maximum output level at short and long wavelengths.

We have found that these objects are achieved by a process for the production of magnetic recording media by preparing a dispersion of anisotropic magnetic materials in solution in an organic binder using dispersants and further conventional additives, applying the dispersion in the form of a layer onto a nonmagnetic substrate and solidifying the magnetic layer, if the dispersion is prepared in a closed cylindrical grinding chamber which has a ratio of length to diameter of from 1.3 : 1 to 2.5 : 1 and contains spherical grinding media having a lower specific gravity than the magnetic material used and a diameter of from 0.5 to 3 mm, while stirring with an anchor stirrer or helical stirrer at from 50 to 1,000 revolutions per minute.

The novel process can be carried out particularly advantageously if a ratio of length to diameter of from 1.5 : 1 to 2.2 : 1, in particular from 1.6 : 1 to 2.0 : 1, is maintained for the dimensions of the grinding chamber. In the grinding chambers according to the novel process, the stirring energy is transferred to the mill base in a very gentle manner by the anchor stirrer and in particular by the helical stirrer, especially at stirring speeds of from 100 to 500 rpm.

The resulting very short milling time of from 1 to 10 hours per chamber load and hence the high spacetime yield, which also results in a low energy consumption, was surprising. Another advantage is that the process can also be carried out within very wide viscosity limits, ie. also at very high flow limits.

Another advantage is that the chamber can be flooded, ie. can be substantially full, during operation. This measure has two advantages, ie. the additional improvement in the space-time yield and minimization of the errors, since no caking can take place in flooded grinding chambers.

The fact that not only finely divided magnetic pigments but also very coarse particles having a specific surface area of less than 20 $m^2/g$ can be divided up in a very gentle manner was also surprising.

The grinding media which are suitable for the novel process have a diameter of from 0.5 to 3 mm, in particular from 0.7 to 2 mm. Although grinding media having a smaller diameter substantially accelerate the dispersing process they are very difficult to separate off from the prepared dispersion. If, on the other hand, grinding media having a larger diameter are used, the dispersing time is increased. Moreover, larger spheres tend to damage the material to be dispersed.

Suitable grinding media have a density which is lower than that of the magnetic material used and is in general less than 5.5, preferably from 1.2 to 4, in particular from 1.2 to 3.2, g/cm$^3$. The type of material plays a minor role and what is important is the hardness and abrasion resistance or breaking strength of the material. Examples of suitable materials are ceramics and, because of their density, in particular glass and plastic grinding media. Suitable ceramic spheres are, for example, $SiO_2 + Al_2O_3$ having a density of 3.4 g/cm$^3$ and the name Stemalox, from Steatit Magnesa AG, or spheres composed only of $Al_2O_3$ (density 3.8 g/cm3) from Metoxit, or $SiO_2$, $Al_2O_3$, $ZrO_2$ (density 3.8 g/cm$^3$) in the form of SAZ granules from Oeckel, or $ZrO_2$ (density 5.4 g/cm$^3$) as zirconium oxide granules from Oeckel. Glass spheres are, for example, those of lead-containing (25% of Pb) or lead-free glass. Examples of plastic grinding media are crosslinked polyoxymethylene grinding media (density 1.3 g/cm$^3$).

The preparation of the dispersion by the novel process is carried out by introducing the magnetic material, the dispersant, the solvent and the dissolved binder and, if required, further additives, into the chamber filled with special grinding media. The process can be carried out by a one-stage or two-stage procedure. In the one-stage dispersing process, the total amount of binder dissolved in solvents is added before the beginning of the milling process. In the two-stage process, which is generally carried out, only some, generally a third to a half, of the total amount of binder is added before the beginning of the milling process and the remaining amount is stirred in only when the dispersion is already homogeneous. For satisfactory processing of the dispersion, it is appropriate if the dispersion has a viscosity of not less than 50, in particular up to 3,000, mPa.s, measured at 25° C.

The magnetic recording media have a known structure and are produced in a known manner.

The preferably used magnetic material is finely divided acicular gamma-iron(III) oxide having a mean particle size of from 0.1 to 2 μm, in particular from 0.1 to 0.9 μm, or acicular chromium dioxide having the same particle structure as stated for iron oxide. Other suitable materials are gamma-iron(III) oxide doped with heavy metals, in particular with cobalt and/or nickel. Finely divided chromium dioxide, metal pigments or barium ferrite are particularly suitable.

The binders forming the magnetizable layer consist of not less than 50% by weight of polyurethanes. For example, solvent-containing polyurethane elastomers, as described in, for example, DE-B 11 06 959 or DE-B 27 53 694, are suitable for this purpose. Other suitable polyurethanes are disclosed in DE-A 32 26 995, 32 27 163 and 32 27 164. The polyurethanes may be used as sole binders or, preferably, as mixtures with other polymers (for example polyvinylformals, phenoxy resins or vinyl chloride copolymers). Preferably from 10 to 40% of the second binder component are added. A particular advantage of these binders is that additional dispersants can be dispensed with completely or partly.

Crosslinking of the magnetic recording media, which may be required depending on the binder system and property profile of the tape, is effected by reacting the polyurethanes or polyurethane binder mixtures with polyisocyanates. Many organic di-, tri- or polyisocyanates or isocyanate prepolymers having a molecular weight of not more than 10,000, preferably from 500 to 3,000, can be used for crosslinking. Polyisocyanates which carry more than 2 NCO groups per molecule are preferred. Polyisocyanates based on toluylene diisocyanate, hexamethylene diisocyanate or isophorone diisocyanate, which are formed by polyaddition with di- or triols or by biuret or isocyanurate formation, have proven particularly suitable. An adduct of toluylene diisocyanate with trimethylolpropane and diethylene glycol is particularly advantageous. The amount of polyisocyanate used must be adapted to the particular binder system.

The solvents used are water, cyclic ethers, such as tetrahydrofuran and dioxane, and cyclic ketones, such as cyclohexanone, depending on the binder used. The polyurethanes are also soluble in other strongly polar solvents, such as dimethylformamide, N-methylpyrrolidone, dimethyl sulfoxide or ethylglycol acetate. It is also possible to mix the stated solvents with aromatics, such as toluene, xylene and esters, such as ethyl or butyl acetate.

In general, further additives for improving the magnetic layer are added to the dispersion of magnetic material and binder. Examples of such additives are fatty acids, polycarboxylic acids, mono-, di- or polysulfonic acids or phosphoric acids, mixtures thereof, esters or salts with metals of Groups one to four of the Periodic Table and waxes, lecithins, silicone oils and fluorocarbons, and also fillers, such as carbon black, graphite, quartz powder and/or nonmagnetizable silicatebased powders. Usually, such additives account in total for less than 10% by weight, based on the magnetic layer.

The magnetizable layers are produced in a known manner. For this purpose, the magnetic dispersion is applied to the nonmagnetic substrate with the aid of a conventional coating apparatus, for example a knife coater. Suitable nonmagnetic substrates are the conventional substrates, in particular films of linear polyesters, such as polyethylene terephthalate, in general having a thickness of from 4 to 200 μm, in particular from 6 to 36 μm. Before the still liquid coating mixture is dried on the substrate, which is advantageously carried out at from 50 to 100° C in the course of from 2 to 200 s, the anisotropic magnetic particles are oriented along the intended recording direction by the action of a magnetic field. Thereafter, the magnetic layers can be calendered and compacted on conventional apparatuses by being passed between heated and polished rollers, if necessary with the use of pressure and temperatures of from 20 to 100° C., preferably from 40 to 80° C. The thickness of the magnetic layer is in general from 1 to 20 μm, preferably from 2 to 12 μm.

The novel magnetic recording media have improved mechanical properties while retaining the good recording and playback quality. The improved signal to print-through ratio, the higher residual induction and the short dispersing time as well as the avoidance of drops in output level as a result of errors should be singled out.

The Examples and Comparative Experiments which follow illustrate the invention. In the Examples, parts are by weight.

POLYMER A 108.75 g of toluylene diisocyanate, dissolved in 108 g of tetrahydrofuran, were heated to 60° C. and one drop of dibutyltin dilaurate was added. 150 g of an OH-containing polyester obtained from adipic acid and 1,4-butanediol and having a molecular weight of 1,000, 18.6 g of ethylene glycol and 4.47 g of trimethylolpropane, dissolved in 200 g of tetrahydrofuran, were added in the course of 2.5 hours. After one hour, a further drop of dibutyltin dilaurate was added. After an NCO content of 1.78% had been reached, the mixture was cooled to 45° C. and 26.25 g of diethanolamine then added. The resulting product had a solids content of 50%, an OH number of 91 and a K value of 24 (measured using a 1% strength solution in dimethylformamide).

POLYMER B

In a heatable reaction vessel having a capacity of 150,000 parts by volume and equipped with a stirrer and reflux condenser, 6,600 parts of a polyesterdiol obtained from adipic acid and 1,4-butanediol (molecular weight about 1,000), 778 parts of 1,4-butanediol, 42 parts of trimethylolpropane and 4,046 parts of diphenylmethylene 4,4'-diisocyanate were dissolved in 460,343 parts of tetrahydrofuran and heated to about 55° C. The components were reacted to a final viscosity of 20 Pa.s and the mixture was then diluted to a solids content of 12.5% with 34,571 parts of tetrahydrofuran. At the same time, the reaction was stopped by adding 100 parts of diethanolamine. The K value of the resulting polymer was 63 (measured using a 1% strength solution in dimethylformamide). The OH number was 12.

EXAMPLE 1

102 parts of tetrahydrofuran, 26.3 parts of a 50% strength solution of the polyureaurethane (polymer A), 28 parts of a 20% strength solution of a phenoxy resin prepared from epichlorohydrin and bisphenol A, 100 parts of a ferromagnetic chromium dioxide ($H_C=40.5$ A/m, BET = 26.5 m$^2$/g), 2.5 parts of zinc oleate, 0.25 part of a commercial silicone oil and 1 part of n-butyl stearate were introduced into a grinding chamber having a capacity of 600 parts by volume and a length/diameter ratio of 1.88 : 1, provided with a helical stirrer and containing 420 parts of glass spheres having a diameter of from 0.8 to 1.2 mm, and the batch was dispersed for 3 hours. The dispersion was then filtered under pressure, provided, while stirring, with 0.039 part of a 50% strength solution of a triisocyanate obtained from 3 moles of toluylene diisocyanate and 1 mole of trimethylolpropane, based on one part of dispersion, and immediately thereafter applied to an 11 μm thick polyethylene terephthalate film. The coated film was passed through a magnetic field to orient the magnetic particles and then dried at from 50 to 80° C. and calendered by being passed between heated rollers under pressure at 60° C., nip pressure 200 kg/cm.

The magnetic properties were measured in a magnetic field of 160 kA/m.

After slitting into 3.81 mm wide tapes, the electroacoustic properties were tested according to DIN 45,401, 45,403 and 45,212 (Sheet 12), against reference tape U 564 W. The results of the measurements are shown in Table 1.

COMPARATIVE EXAMPLE 1

The composition as described in Example 1 was dispersed in a ball mill having a capacity of 600 parts by volume and containing 600 parts of steel balls having a diameter of from 4 to 6 mm The dispersing time was 48 hours. The results of the measurements are summarized in Table 1.

COMPARATIVE EXAMPLE 2

The composition as described in Example 1 was processed to a dispersion in the course of 6 hours in a stirred ball mill containing ceramic balls having a diameter of from 1 to 1.5 mm and a density of 3.8, and coating was carried out in a similar manner. The measured results determined for the resulting magnetic tape are shown in Table 1.

TABLE 1

| | Example 1 | Comparative Example 1 | Comparative Example 2 |
|---|---|---|---|
| Layer thickness [μm] | 5.1 | 4.8 | 5.2 |
| Residual induction [mT] | 185 | 168 | 175 |
| Orientation ratio | 3.2 | 2.9 | 3.0 |
| Sensitivity at long wavelengths $E_T$ 315 Hz [dB] | −0.7 | −1.1 | −1.0 |
| Sensitivity at short wavelengths $E_H$ 10 kHz [dB] | −1.5 | −1.7 | −1.5 |
| Maximum output level at long wavelengths $A_T$ 315 Hz [dB] | 1.5 | 0.7 | 0.9 |
| Maximum output level at short wavelengths $A_H$ 10 kHz [dB] | −1.5 | −1.6 | −1.4 |
| Signal to print-through ratio [dB] | 56 | 52 | 53. |

EXAMPLE 2

380 kg of a ferromagnetic chromium dioxide pigment having a mean particle size of 0.5 μm, a length/width ratio of from 4 : 1 to 9 : 1, a coercive force of 40 kA/m and a specific surface area of 26 m$^2$/g, together with 111.6 kg of 16.5% strength solution of the polymer B, 46 kg of a 16.5% strength solution of a polyvinylformal, consisting of 82% of vinylformal units, 12% of vinyl acetate units and 6% of vinyl alcohol units, 5.6 kg of zinc stearate, 1.9 kg of stearylamide, 1.9 kg of N-tallow fatty-1,3-diamine dioleate and 339 kg of a mixture of equal amounts of tetrahydrofuran and dioxane were introduced into a grinding chamber having a length/diameter ratio of 1.88 : 1 and a capacity of 2000 l and containing 1400 kg of glass spheres having a diameter of 1 to 1.4 mm, and were dispersed for 3 hours at 140 rpm. Thereafter, in the subsequent phase, a further 260.5 kg of polymer B and 107.5 kg of the polyvinylformal solution were added and dispersing was continued for a further 15 minutes. The dispersion was then removed from the mill and filtered under pressure through a filter of 5 μm pore size. After the filtration, 17 g of a 50% strength solution of a triisocyanate obtained from 3 moles of toluylene diisocyanate and 1 mole of trimethylolpropane were added per kg of dispersion while stirring vigorously. The dispersion was then applied to an 11.5 μm thick polyethylene terephthalate film by means of a conventional knife coater. The coated film was passed through a magnetic field to orient the magnetic particles and then dried at from 50 to 90° C. After drying, the magnetic layer was compacted and calendered by being passed through a roll nip at 200 kp/cm, so that the thickness of the magnetic layer was 5 μm, and this was followed by slitting into 3.81 mm wide audio tapes. The results of the measurements are summarized in Table 2.

COMPARATIVE EXAMPLE 3

The composition as described in Example 2 was dispersed in a ball mill having a capacity of 2,600 l and containing 3,000 kg of steel balls having a diameter of from 4 to 6 mm. The dispersing time in phase I was 72 hours and that in phase II was 24 hours.

TABLE 2

|  | Example 2 | Comparative Example 3 | Comparative Example 4 |
|---|---|---|---|
| Layer thickness [μm] | 4.9 | 4.9 | 5.0 |
| Residual induction [mT] | 180 | 160 | 165 |
| Sensitivity at long wavelengths $E_T$ 315 Hz [dB] | −0.9 | −1.2 | −1.1 |
| Maximum output level at long wavelengths $A_T$ 315 Hz [dB] | +1.8 | +0.9 | +1.0 |
| Signal to print-through ratio [dB] | 60 | 55 | 54 |

EXAMPLE 3

The procedure described in Example 2 was followed, except that the $CrO_2$ used had an $H_C$ of 35 A/m and a specific surface area of 19 m$^2$/g. The dispersing time was 2 hours in phase I and 10 minutes in phase II. The results of the measurements are shown in Table 3.

COMPARATIVE EXAMPLE 5

The procedure described in Comparative Example 3 was followed, except that the $CrO_2$ used had an H of 35 A/m and a specific surface area of 19 m$^2$/g. The dispersing time was 70 hours in phase I and 16 hours in phase II. The results of the measurements are shown in Table 3.

EXAMPLE 4

The procedure described in Example 2 was followed, except that the $CrO_2$ used had an $H_C$ of 48 A/m and a specific surface area of 29.5 m$^2$/g. The dispersing time was 3 hours in phase I and 10 minutes in phase II. The results of the measurements are shown in Table 3.

COMPARATIVE EXAMPLE 6

The procedure described in Comparative Example 3 was followed, except that the $CrO_2$ used had an $H_C$ of 48 A/m and a specific surface area of 29.5 m$^2$/g. The dispersing time was 40 hours in phase I and 16 hours in phase II. The results of the measurements are shown in Table 3.

TABLE 3

|  | Example | | Comparative Example | |
|---|---|---|---|---|
|  | 3 | 4 | 5 | 6 |
| Layer thickness [μm] | 4.9 | 5.1 | 4.8 | 5.2 |
| Residual induction [mT] | 195 | 172 | 180 | 165 |
| Orientation ratio | 3.5 | 3.1 | 3.1 | 2.7 |
| Sensitivity at long wavelengths $E_T$ 315 Hz [dB] | +0.5 | — | 0 | — |
| Sensitivity at short wavelengths $E_H$ 10 kHz [dB] | — | 1.5 | — | 1.3 |
| Maximum output level at long wavelengths $A_T$ 315 Hz [dB] | 1.5 | — | 0.8 | — |
| Maximum output level at short wavelengths $A_H$ 10 kHz [dB] | — | 1.6 | — | 1.4 |
| Signal to print-through ratio [dB] | 59 | 58 | 54 | 52 |

EXAMPLE 5

A two-layer magnetic tape was produced by first applying a dispersion according to Example 3 as a lower layer and then a dispersion according to Example 4 as an upper layer on a 6.8 μm thick substrate film. The thickness of the lower layer was 3.8 μm and that of the upper layer 2.9 μm. After surface treatment, the total thickness was 5.9 μm. The results of the measurements are shown in Table 4.

COMPARATIVE EXAMPLE 7

The procedure described in Example 5 was followed, except that a dispersion according to Comparative Example 5 was used for the lower layer and one according to Comparative Example 6 for the upper layer. The final thickness was 5.8 μm. The results of the measurements are shown in Table 4.

TABLE 4

|  | Example 5 | Comparative Example 7 |
|---|---|---|
| Layer thickness [μm] | 5.8 | 5.8 |
| Residual induction [mT] | 177 | 170 |
| Orientation ratio | 3.3 | 2.9 |
| Sensitivity at long wavelengths $E_T$ 315 Hz [dB] | 0.3 | 0 |
| Sensitivity at short wavelengths $E_H$ 10 kHz [dB] | 1.4 | 1 |
| Maximum output level at long wavelengths $A_T$ 315 Hz [dB] | 2.0 | 1.4 |
| Maximum output level at short wavelengths $A_H$ 10 kHz [dB] | 1.4 | 1.4 |
| Signal to print-through ratio [dB] | 57 | 52 |

EXAMPLE 6

3,921 g (=100 parts) of a magnetic gamma-iron(III) oxide having a coercive force of 26 kA/m and a specific surface area of 20 m$^2$/g were introduced into a grinding chamber having a length/diameter ratio of 1.88 : 1 and a capacity of 17.5 liters and containing 7.7 kg of plastic grinding media consisting of crosslinked polyoxymethylene having a density of 1.3 g/cm$^3$ and a diameter of from 3 to 4 mm. Furthermore, 3.09 parts of a coarseparticled α-$Fe_2O_3$ having a specific surface area of 3 g/m$^2$ and a mean particle size of 0.93 μm, 9.2 parts of a 25% strength solution of a methylpolyglycol acrylate/methacrylic acid copolymer, from 27 to 49 parts of a 12.5% strength polymer solution (polymer B), 4.13 parts of a polymer A, 5.31 parts of a 25% strength solution of a polyvinylformal, consisting of 82% of polyvinylformal, 12% of vinyl acetate and 6% of vinyl alcohol, and 67.66 parts of tetrahydrofuran were introduced. The solvent used in the polymer solutions was likewise tetrahydrofuran. The mixture was then dispersed for 6.5 hours in the dispersing unit described, at a dispersing temperature of from 30 to 35° C. The mill was 53% full, the speed was 350 rpm and the peripheral velocity was 3.6 m/s. After this predispersing time of 6.5 hours, a mixture consisting of 54.99 parts of polymer solution B, 5.0 parts of polymer solution A, 10.99 parts of the polyvinylformal solution, 1.03 parts of isostearic acid, 0.52 part of butyl stearate, 0.21 part of hydroquinone, 0.1 part of a commercial silicone oil and 16.41 parts of tetrahydrofuran was metered in over 5 minutes while stirring and was incorporated for a further 10 minutes.

After the end of the dispersing process, the grinding chamber was emptied while stirring, the magnetic dispersion was filtered through a commercial filter, provided with 10.6 g of 50% strength solution of a triisocyanate obtained from 3 moles of toluylene diisocyanate and 1 mole of trimethylolpropane, per kilogram of dispersion, and then applied, using a knife coater, to a 33 µm thick polyethylene terephthalate film, and the magnetic layer was calendered by means of a calender roll system at 90° C. and at a nip pressure of 200 kp/cm.

The magnetic tape thus obtained was slit into a width of 6.25 mm and tested at 38 cm/s against a reference tape from Ampex using a Vacodur head with a head gap of 7 µm.

The results of the measurements are shown in Table 5.

COMPARATIVE EXAMPLE 8

The starting materials stated in Example 6, in a total amount increased by a factor of 1.11, were introduced into a ball mill having a capacity of 30 liters and provided with 8 integral steel pins and 40 kg of steel balls having a diameter of from 4 to 6 mm and a density of from 7.6 g/cm$^3$, as the grinding medium. The predispersing time was 48 hours at a dispersing temperature of from 30 to 35° C. Thereafter, the binder/additive solution described in Example 6 was introduced as stated there and was incorporated for a further 24 hours. Processing of the dispersion to the finished tape stage was carried out according to Example 6. The results of the measurements are shown in Table 5.

TABLE 5

|  | Example 6 | Comparative Example 8 |
|---|---|---|
| Layer thickness [µm] | 16.7 | 15.2 |
| Residual induction [mT] | 163 | 155 |
| Coercive force [kA/m] | 25.0 | 24.3 |
| Sensitivity at long wavelengths $E_T$ 315 Hz [dB] | +0.1 | +0.1 |
| Sensitivity at short wavelengths $E_H$ 10 kHz [dB] | ±0 | −0.2 |
| Maximum output level at long wavelengths $A_T$ 315 kHz [dB] | +1.3 | +0.7 |
| Maximum output level at short wavelengths $A_H$ 10 kHz [dB] | +0.3 | +0.3 |
| Signal to print-through ratio [dB] | 53.8 | 49.5 |

We claim:

1. In a process for the production of a magnetic recording medium wherein a dispersion of anisotropic magnetic material in an organic binder is applied in the form of a layer onto a non-magnetic substrate and the applied magnetic layer is solidified, the improvement which comprises: preparing the dispersion by stirring the magnetic material and binder along with a dispersant with an anchor stirrer or a helical stirrer at from 50 to 1000 revolutions per minute in a closed cylindrical grinding chamber having a ratio of length to diameter of from 1.3:1 to 2.5:1, said chamber containing spherical grinding media having a lower specific gravity than the magnetic material in the chamber and having a diameter of from 0.5 to 3 mm.

2. The process of claim 1, wherein the spherical grinding media has a density of 1.2 to 4 g/cm$^3$.

3. The process of claim 1, wherein the closed cylindrical grinding chamber has a ratio of length to diameter of from 1.5:1 to 2.2:1.

4. The process of claim 1, wherein the closed cylindrical grinding chamber has a ratio of length to diameter of from 1.6:1 to 2.0:1.

5. The process of claim 1, wherein the stirrer is rotated at a rate of from 100 to 500 rpm.

6. The process of claim 1, wherein the spherical grinding media has a diameter of from 0.7 to 2 mm.

* * * * *

UNITED STATES PATENT AND TRADEMARK OFFICE
CERTIFICATE OF CORRECTION

PATENT NO. : 5,082,689

DATED : January 21, 1992

INVENTOR(S) : Ludwig KREITNER et al.

It is certified that error appears in the above-identified patent and that said Letters Patent is hereby corrected as shown below:

On the Cover Page

That part of the Assignee "Basf" should read --BASF--

Signed and Sealed this

Twenty-seventh Day of April, 1993

Attest:

MICHAEL K. KIRK

Attesting Officer

Acting Commissioner of Patents and Trademarks